United States Patent [19]

Bruder et al.

[11] 4,023,168
[45] May 10, 1977

[54] RADAR ALTIMETER

[75] Inventors: Joseph A. Bruder, Snyder; Marcus Staloff, Williamsville, both of N.Y.

[73] Assignee: Calspan Corporation, Buffalo, N.Y.

[22] Filed: July 11, 1975

[21] Appl. No.: 595,264

[52] U.S. Cl. .......................... 343/7 ED; 343/12 A
[51] Int. Cl.² ...................................... G01S 9/06
[58] Field of Search ...................... 343/7 ED, 12 A

[56] References Cited

UNITED STATES PATENTS

| 3,167,766 | 1/1965 | Norris, Jr. | 343/12 A X |
| 3,231,889 | 1/1966 | Leyde et al. | 343/12 A X |
| 3,305,862 | 2/1967 | Samuel et al. | 343/12 A X |
| 3,309,703 | 3/1967 | Ammon et al. | 343/12 A X |
| 3,366,956 | 1/1968 | Westby | 343/12 A X |
| 3,757,327 | 9/1973 | Wiley, Jr. | 343/7 ED X |

Primary Examiner—T.H. Tubbesing
Attorney, Agent, or Firm—David J. Zobkiw

[57] ABSTRACT

Following an emergency ejection from an aircraft, a radar altimeter is used to sense when a pilot or crewman, descending by parachute, is within 100 to 500 feet of the underlying terrain. When the predetermined altitude range is reached, the radar altimeter actuates a release mechanism and deploys a survival kit which remains connected to the parachutist via a strap or lanyard. The device can also be modified to measure and indicate the altitude above the terrain to function as a normal radar altimeter.

6 Claims, 4 Drawing Figures

RADAR ALTIMETER

The invention herein described was made in the course of or under a subcontract with the U.S. Air force.

Existing radar altimeters are not suitable for incorporation into a survival kit attached to a pilot or crewman for a number of important reasons including weight, size and power consumption. Difficulties are also associated with the use of barometric altimeters for deploying a survival kit since they use sea level, rather than the local terrain, as the datum plane, and, additionally, such a device is sensitive to weather associated changes in barometric pressure.

It is an object of this invention to provide a radar altimeter activation system for releasing and deploying a survival kit.

It is a further object of this invention to provide a radar altimeter which will produce a trigger signal to activate a mechanical release mechanism whenever the altimeter senses terrain returns in the 100 to 500 foot altitude range.

It is a still further object of this invention to provide a radar altimeter in which the signal is both transmitted and received by the same antenna.

It is an additional object of this invention to provide an altimeter which is inherently rugged and reliable and which can be reduced to a small size with low power consumption. These objects and others as will become apparent hereinafter, are accomplished by the present invention.

According to the present invention, an altimeter transmits a radio frequency (RF) pulse toward the earth and receives the terrain echo through the same antenna. A tuned RF receiver incorporating a diode switch, bandpass filter, RF amplifier and detector senses the received terrain echo and converts it to a video signal. The detected video signal is amplified and, if its amplitude exceeds threshold and its time of arrival corresponds to the 100 to 500 foot altitude range, the terrain echo signal is integrated and a trigger signal is generated to deploy the survival kit. The deploy survival kit, which may contain a life raft which is inflated upon deployment, will be suspended below the chutist by a nylon strap or lanyard. Release of the survival kit, which weighs approximately 60 pounds, prior to landing is necessary to avoid injury to the chutist when landing on hard terrain and to soften the impact.

BRIEF DESCRIPTION OF THE DRAWINGS

For a fuller understanding of the present invention, reference should now be had to the following detailed description thereof taken in conjunction with the accompanying drawings wherein:

FIG. 3, comprising

DESCRIPTION OF THE PREFERRED EMBODIMENT

Figure 1:
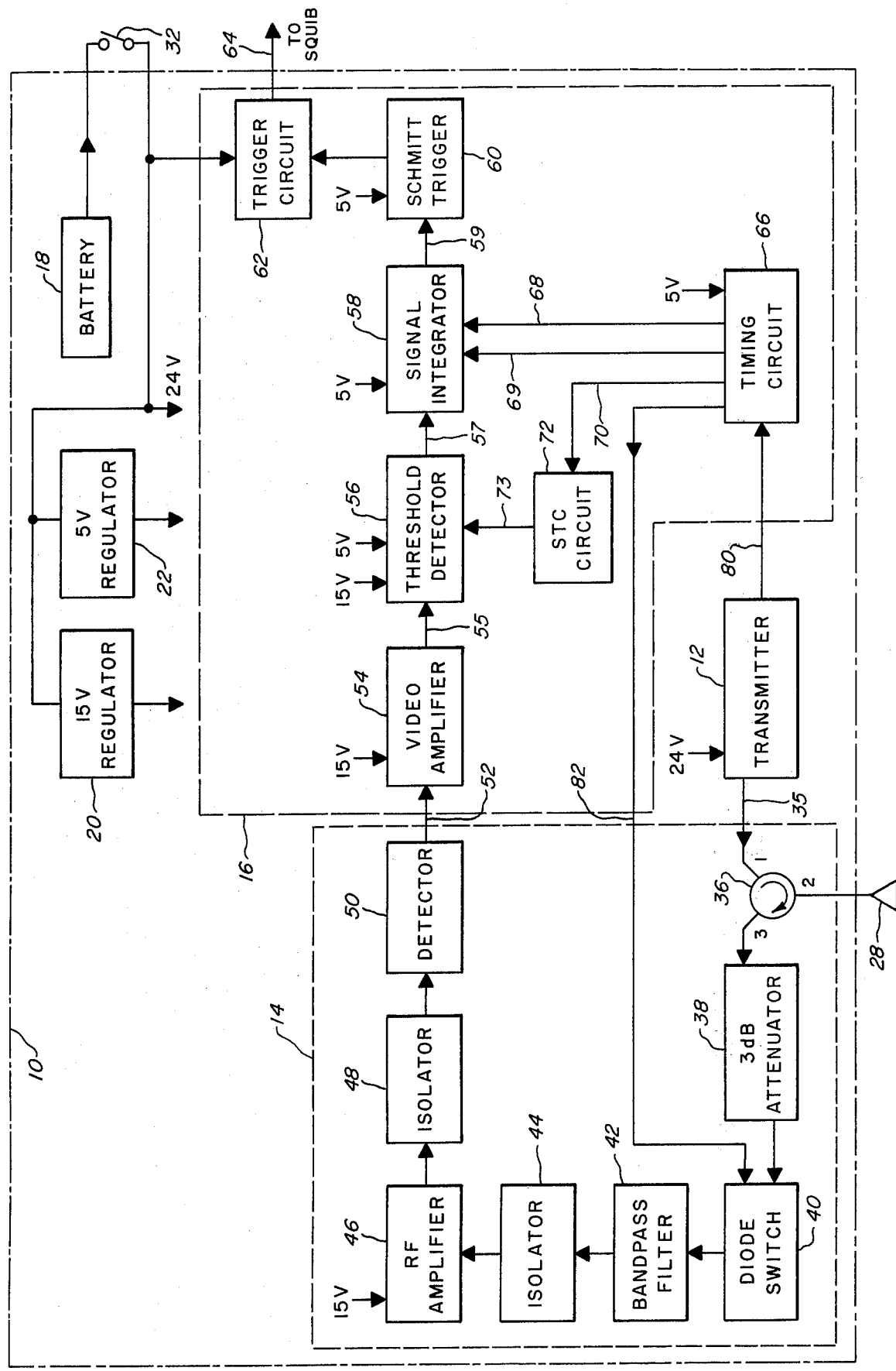
FIG. 1 is a block diagram of a radar altimeter.

The radar altimeter unit of FIG. 1 is located in an enclosure and is generally designated 10. Radar altimeter unit 10 includes a transmitter 12, a tuned RF receiver 14, video processing and timing circuits 16, a power source or battery 18 and voltage regulators 20 and 22. The altimeter unit 10 couples the transmitter pulse to the antenna 28, processes the received terrain echo and supplies a trigger signal to the squib 30 when the measured altitude above the terrain is within the preset 100 to 500 foot range.

Transmitter 12 is a solid-device which consists of a gallium arsenide solid state source operating in the Limited Space-Charge Accumulation Mode (LSA), a pulse forming network, a power supply, and a pulse repetition frequency (PRF) generator. The LSA oscillator is capable of generating RF pulses of relatively high peak power. The PRF generator establishes the timing between pulses and triggers both the pulse forming network and the timing functions in the video processing and timing circuits 16. The pulse forming network supplies a pulse of proper amplitude and width to drive the LSA oscillator. Voltage regulators 20 and 22 convert and regulate the input battery voltage supplied by battery 18 to +15 volts DC and +5 volts DC, respectively, to provide input power to elements of tuned RF receiver 14 and video processing and timing circuits 16. Transmitter 12 is a solid-state device with a nominal peak power output of 15 to 20 watts and operates in the 4200 to 4400 MHz frequency band allocated specifically for radar altimeter operation. Transmitter 12 is connected via line 35 to circulator 36 of tuned RF receiver 14 and is connected via line 80 to timing circuit 66 of video processing and timing circuits 16 to provide a trigger pulse. The tuned RF receiver 14 amplifies the received echo pulse from antenna 28 which is then detected and converted directly to a video signal; thus, no local oscillator, automatic frequency control, or IF amplifier is required. The video signal is supplied via line 52 to video amplifier 54 of video processing and timing circuits 16. The video processing and timing circuits 16 determine when a received echo pulse is within the 100 to 500 foot altitude range, and generates a trigger signal which is supplied via line 64 to fire the squib 30 and deploy the survival kit.

The function of the tuned RF receiver 14 is to provide a video terrain echo signal for the video processing and timing circuits 16. Tuned RF receiver 14 contains all of the RF components with the exception of the transmitter 12. Circulator 36 couples the transmitter pulse to the antenna 28 while providing isolation between transmitter 12 and 3 dB attenuator 38 and couples the received pulse to 3 dB attenuator 38 while providing isolation between the received signal and transmitter 12. The RF pulse propagates from antenna 28 to the terrain beneath it, and a portion of this RF energy is reflected back to antenna 28. The time delay between the transmitted and received pulse is a measure of the altitude of antenna 28 above the terrain. The 3 dB attenuator 38 couples the received echo signal to the diode switch 40 and prevents a strong echo signal from being reflected off diode switch 40 and back into the transmitter 12, should the antenna 28 be near a highly reflective surface. Alternatively, the 3 dB attenuator 38 could be replaced with an isolator. Diode switch 40 provides approximately 60 dB of isolation from the transmitter pulse which leaks through circulator 36, and prevents it from saturating receiver 14. Following the transmitter pulse the diode switch 40 is turned on by a range gate transmitted via line 82 by timing circuit 66 of video processing and timing circuits 16 and passes the received echo pulse with low attenuation. Diode switch 40 is turned off again at 500 feet, thus, gating out high altitude returns from receiver 14. The output of diode switch 40 is supplied to bandpass filter 42 which determines the selectivity of the receiver system. It passes the signals in the 4.2 to 4.4 GHz band with low attenuation, but provides high attenuation to out-of-band signals. At 4.0 and 4.6 GHz, the attenuation of this filter is greater than 50 dB. The RF amplifier 46 is tuned to the nominal transmitter frequency and boosts the received echo power by approximately 17 dB to provide sufficient signal to drive Schottky-barrier detector 50. Proper operation of RF amplifier 46 requires a proper termination both on its input and output. This is insured by the isolators 44 and 48 on its input and output, respectively. The signal from the RF amplifier 46 is detected in Schottky-barrier detector 50 which converts the RF signal to a video pulse corresponding to the terrain return, which is coupled to the video amplifier 54 of video processing and timing circuits 16. The video signal from the Schottky-barrier detector 50 is amplified in video amplifier 54 to provide a sufficient signal level for the threshold detector or comparator 56. Video amplifier 54, which contains limiting circuits to reduce the saturation effects from strong signals, supplies the amplified signal via line 55 to threshold detector 56 which compares the amplified signal supplied by video amplifier 54 with a threshold signal supplied via line 73 by sensitivity time control (STC) circuit 72 and supplies a signal via line 57 as an input to signal integrator 58. The STC circuit 72 raises the threshold at short ranges thus requiring a stronger video signal to exceed threshold. Timing circuit 66 receives a trigger pulse from transmitter 12 via line 80 and supplies timing signals to diode switch 40, STC circuit 72 and signal integrator 58 via lines 82, 70 and 68 and 69, respectively. The integrated output of signal integrator 58 is supplied via line 59 to Schmitt trigger 60 which in turn is connected to trigger circuit 62 which supplies a trigger pulse to squib 30 via line 64 to cause the deployment thereof.

Figure 2:
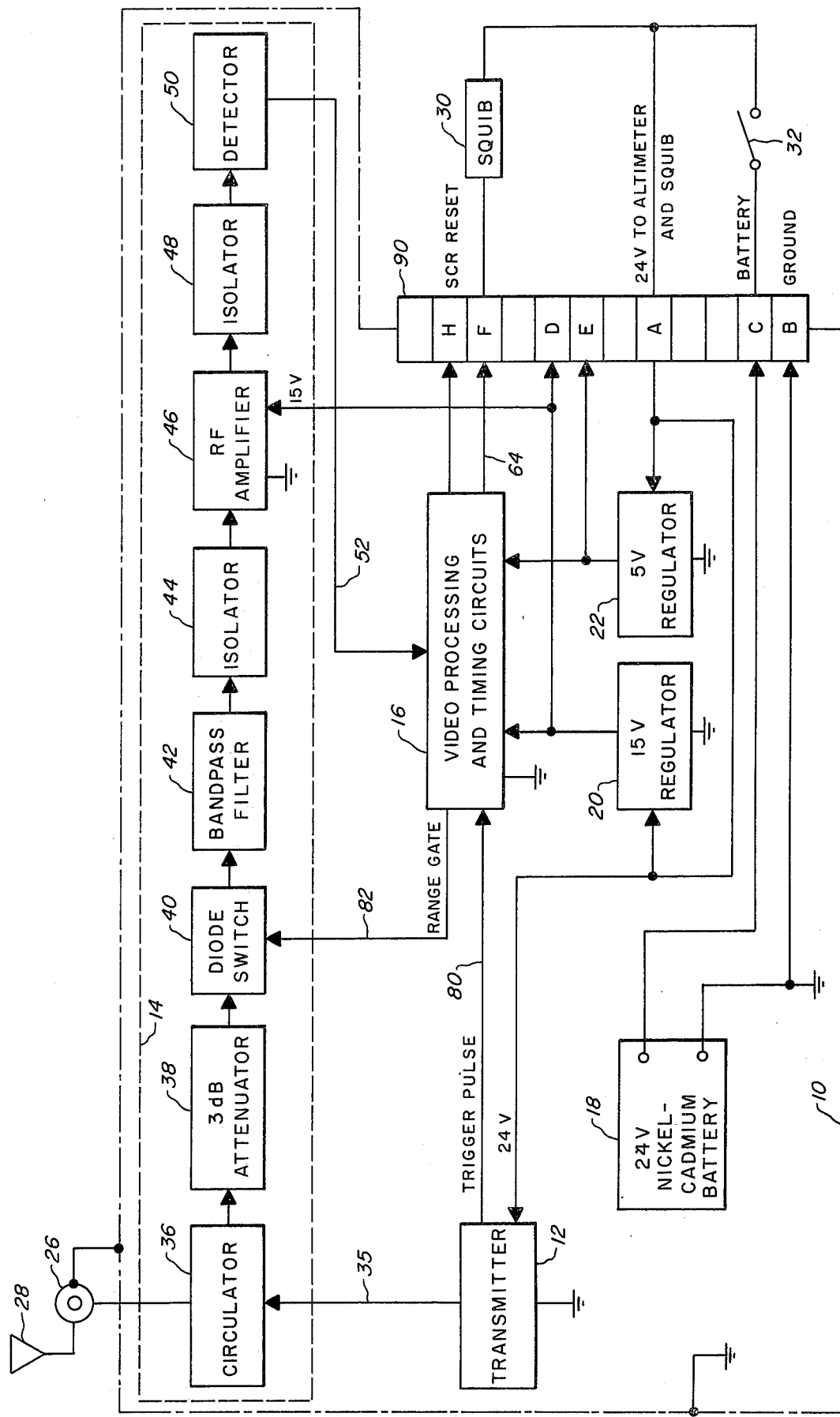
FIG. 2 is an interconnection diagram for an altimeter unit.

The interconnections of the altimeter unit are shown in detail in FIG. 2. It will be noted that an antenna connector 26 is located intermediate antenna 28 and circulator 36 to provide an interconnection there between. Connector board 90 provides interconnections between battery 18 and squib 30, video processing and timing circuits 16 and transmitter 12.

Figure 3A:
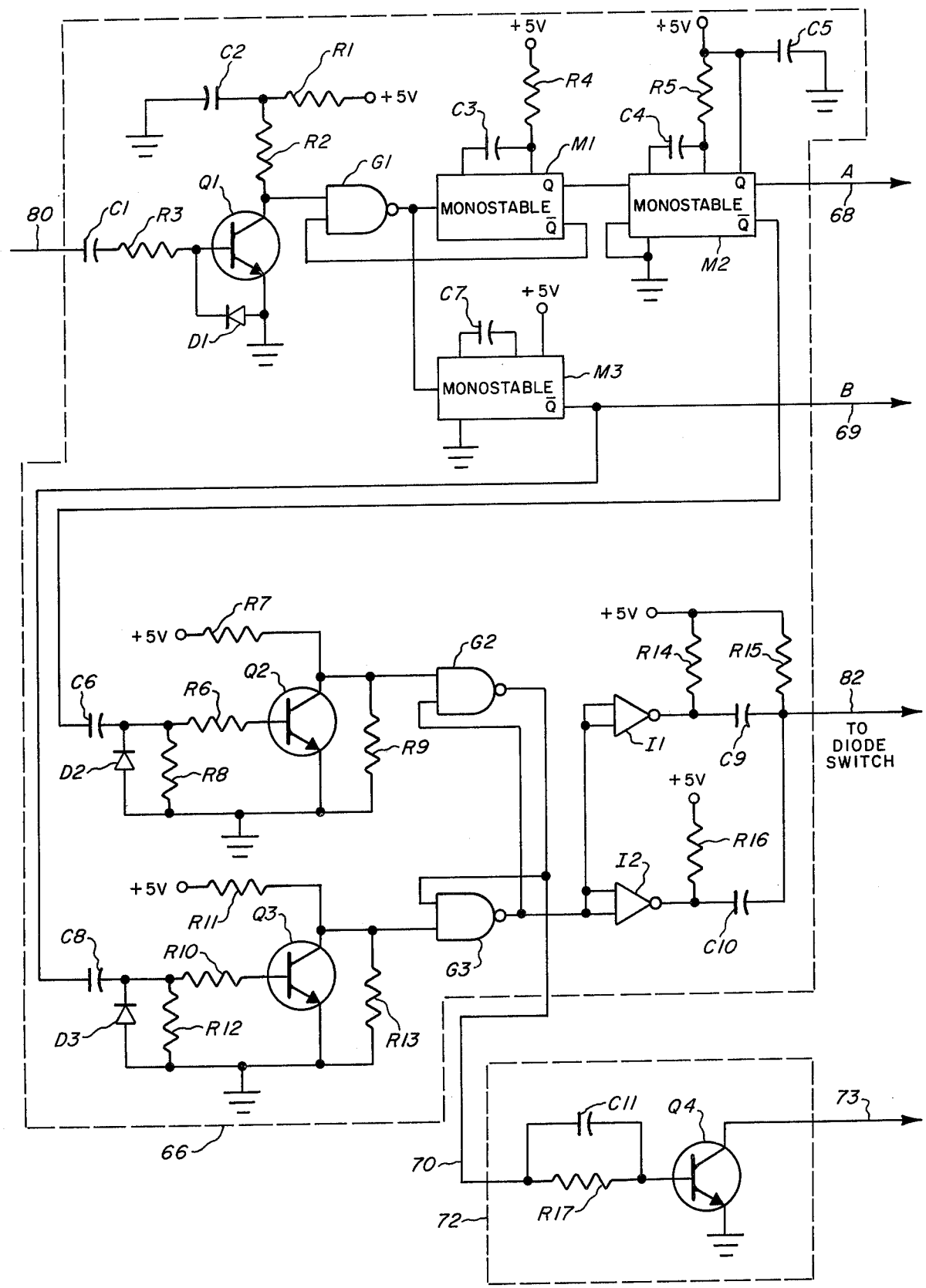
FIGS. 3A and 3B, is a circuit diagram of the signal processor and timing circuits.

A detailed circuit diagram of a portion of the video processing and timing circuits appears in FIG. 3. Referring first to FIG. 3A, the timing circuit 66 which generates the necessary timing waveforms for altimeter unit 10 is activated by a trigger pulse supplied via line 80 by transmitter 12 and which occurs simultaneously with the RF transmitter pulse at time $t_o$. The trigger pulse is inverted by a shaping circuit made up of capacitor C1, resistors R2 and R3, diode D1 and transistor Q1 and supplied as a first input to gate G1. Resistor R1 and capacitor C2 serve as decoupling to isolate the shaping circuit from the +5 volts. The output of gate G1 triggers monostables M1 and M3. The output ($\overline{Q}$) of monostable M1, a negative pulse 0.3 $\mu$ seconds in duration, which is set by resistor R4 and capacitor C3 is coupled back into gate G1 to provide a second input to keep the output of gate G1 in the "high" state until a sufficient time period, e.g. 0.3 $\mu$ seconds, has elapsed to prevent the retriggering of monostable M3 by ringing on the trigger pulse. The output (Q) of monostable M1, a positive pulse of 0.3 $\mu$ sec duration, is coupled to the input of monostable M2 which is triggered by the trailing edge of the pulse out of monostable M1. The output of monostable M3, a negative pulse of 0.1 $\mu$ sec set by capacitor C7 and an internal resistor in M3, is fed to the one shot circuit defined by capacitor C8, diode D3 and resistors R10, R11, R12 and R13 associated with transistor Q3 which generates approximately a 0.1 $\mu$ second negative pulse at the trailing edge of the pulse from monostable M3 and provides a first input to gate G3 which causes gate G3 to be set to the "high" state and the output of gate G2 to be set to the "low" state at approximately 0.1 $\mu$ seconds from $t_o$. Capacitor C5 helps filter the +5V. The output of monostable M2, a negative pulse of 0.8 $\mu$ seconds duration set by resistor R5 and capacitor C4, is coupled to the one shot circuit of transistor Q2 which includes capacitor C6, diode D2 and resistors R6, R7, R8 and R9 and in a similar manner generates approximately a 0.1 $\mu$ second negative pulse at the trailing edge of the output signal of monostable M2. This pulse then resets the output of gate G2 to the "high" state and the output of gate G3 to the "low" state at approximately 1.1 $\mu$ seconds from $t_o$. The output of gate G3 is supplied to inverter I1 and I2. The outputs of inverters I1 and I2, which are attached to pull-up resistors R14 and R16, respectively, are coupled through capacitors C9 and C10, respectively, to provide the gate pulse supplied to diode switch 40 via line 82. Diode switch 40 clamps the baseline of the gate pulse to +0.7 volts and resistor R15 provides bias to diode switch 40 to keep it in the high isolation condition. At approximately 0.1 $\mu$ seconds from $t_o$ the gate pulse switches to approximately -2.5 volts back biasing the diode switch 40 causing it to have low attenuation for the microwave signals. Diode switch 40 remains in the low attenuation mode until approximately 1.1 $\mu$ seconds. The output from gate G2 drives STC circuit 72 which consists of resistor R17, capacitor C11 and transistor Q4 and which generates a signal which is supplied via line 73 to threshold detector 56.

The output (Q) of monostable M2 provides an altitude range gate signal "A" which is supplied via line 68 to signal integrator 58. The signal "A" switches from the "low" state to the "high" state at approximately 0.3 $\mu$ seconds and switches back to the "low" state at approximately 1.1 $\mu$ seconds. Allowing for approximately a 0.1 $\mu$ second delay of the terrain return echo through the video amplifier 54 and threshold comparator or detector 56, the range pulse signal "A" is "high" for signal returns with associated time delays corresponding to the 100 to 500 foot altitude range. The signal "B" is the output of monopulse M3 and is supplied via line 69 to signal integrator 58 and is coincident with the transmitter pulse and initially resets flip-flop 120 of signal integrator 58 to the "low" state.

Figure 3B:
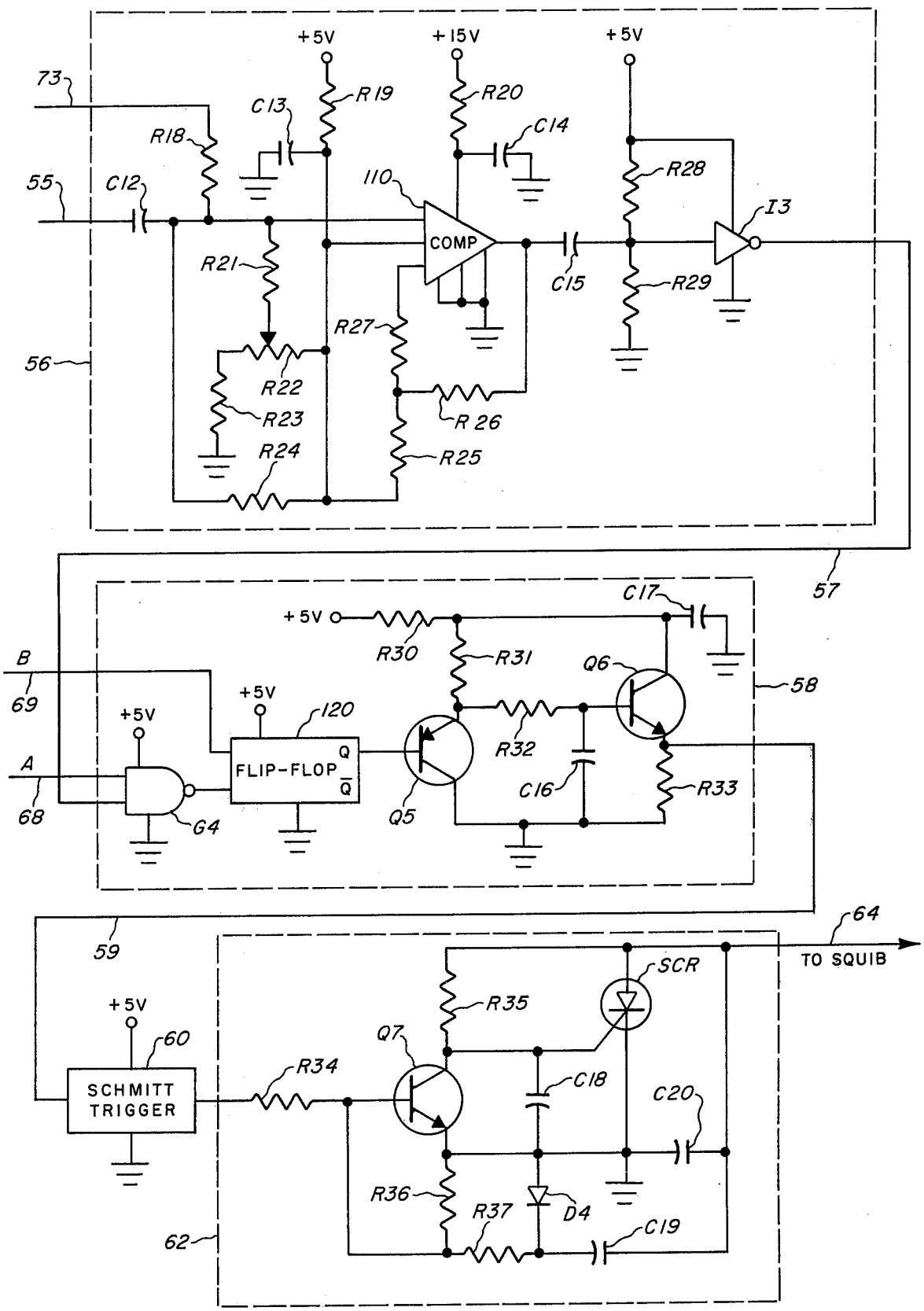

Referring to FIG. 3B, the video signal from the Schottky-barrier detector 50 is amplified in the video amplifier 54 to provide sufficient signal level for threshold detector or comparator 56. The amplified video signal which is supplied via line 55 is AC coupled via capacitor C12 into threshold detector 56 where it is compared to a threshold level established by resistors R21, R22, R23 and R24 and the signal supplied via line 73 and resistor R18 from STC circuit 72. If the video signal supplied via line 55 exceeds the threshold level of the signal supplied by STC circuit 72 via line 73, a negative pulse is generated by the comparator circuit which is made up of comparator 110 and resistors R25, R26 and R27. Decoupling from the +5V and +15V is provided by capacitor C13 and resistor R19, and by capacitor C14 and resistor R20, respectively. STC circuit 72 raises the threshold at short ranges thus requiring a stronger video signal to exceed threshold. The output of comparator 110 is coupled to inverter I3 via capacitor C15 and resistors R28 and R29 to provide a positive pulse (when a terrain signal is detected) of suitable level for signal integrator 58. The output of inverter I3 is fed via line 57 to nand gate G4 as a first input. A second signal "A" is supplied to nand gate G4 by timing circuit 66 via line 68. The second signal "A" which is supplied to nand gate G4 via line 68 is "high" for time of arrivals corresponding to the 100 to 500 foot altitude range. If a positive pulse occurs at the inverter I3 within the time that the signal "A" is "high", this causes a negative pulse out of gate G4 which then causes the output of flip-flop 120 to be set to the "high" state. The flip-flop output remains in the "high" state until it is reset to the "low" state at the following transmitter pulse time by signal "B" which is supplied from timing circuit 66 via line 69. If no positive pulse out of inverter I3 occurs within the time the signal "A" is high, the gate G4 remains positive, and the output of flip-flop 120 remains in the low state. Thus, flip-flop 120 is set into the "high" state only if a terrain return signal of sufficient amplitude occurs within the 100 to 500 foot altitude range.

The output of flip-flop 120 is coupled to an integrator consisting of transistors Q5 and Q6, resistors R31, R32 and R33 and capacitor C16. Decoupling from +5V is provided by resistor R30 and capacitor C17. If consistent terrain returns occurring in the 100 to 500 foot range interval are detected, the output of flip-flop 120 will remain in the "high" state a very high percentage of the time. This positive voltage is then coupled by transistor Q5 to resistor R32 and capacitor C16. The positive voltage will cause the voltage on capacitor C16 to charge towards that positive voltage. The voltage on capacitor C16 is coupled through transistor Q6 to Schmitt trigger 60. When the voltage at the output of transistor Q6 increases to approximately 1.7 volts, the Schmitt trigger 60 will switch from the "high" to to "low" state, causing the inverter consisting of transistor Q7, and resistors R34, R35 and R36 of trigger circuit 62 to switch from a saturated state and back biasing transistor Q7 so that the current into the collector becomes negligible. With the squib 30 attached to the altimeter 10, the voltage at the top of resistor R35 is approximately 24 volts. The current through resistor R35 when transistor Q7 is back biased will cause the voltage on capacitor C18 to increase and when the voltage on capacitor C18 increases to approximately 0.7 volts, the silicon controlled rectifier SCR will be switched to a conducting state thereby shorting one side of squib 30 to ground. Since the other side of the squib 30 is at +24 volts, see FIG. 2, the resultant current through squib 30 will cause it to fire and actuate the mechanical release mechanism in the survival kit (not illustrated).

Trigger circuit 62 also has an internal time delay which prevents the silicon controlled rectifier SCR from firing the squib 30 for approximately 2 or more seconds after initially applying power to the altimeter unit 10 by closing switch 32. Capacitor C19 is initially discharged so that when 24 volts is applied by the squib 30 to the circuit, charging current through capacitor C19 flows through resistor R37 into the base of transistor Q7 thereby causing transistor Q7 to saturate until the capacitor C19 is nearly fully charged. Capacitor C20 prevents transients from firing the squib 30 and diode D4 prevents a large negative voltage from being applied to Q7.

OPERATION

Upon the jumping or ejecting of the crewman or pilot from an aircraft, the switch 32 is closed either by the chutist or automatically to activate the radar altimeter unit 10 which is attached to the chutist for deploying a survival kit. An internal time delay in trigger circuit 62 prevents the silicon rectifier SCR from firing the squib 30 for a few seconds after the closing of switch 32. The solid state transmitter 12 furnishes a trigger pulse to video processing and timing circuits 16 via line 80 and generates a 15 to 20 watt peak power RF signal which is both transmitted and received by antenna 28. The receiver 14 is a tuned RF type with diode switch 40 to prevent receiver saturation by the transmitter pulse. The video processing and timing circuits 16 receive the video signal output of receiver 14 via line 52 and optimize the detection of terrain returns while rejecting spurious and incidential radio frequency interference from triggering the system. When the terrain returns indicate an altitude of 100 to 500 feet, the video processing and timing circuits 16 generate a trigger signal which is supplied via line 64 to squib 30 to cause it to fire and deploy the survival kit which remains attached to the chutist by a lanyard or the like.

Although a preferred embodiment of the present invention has been illustrated and described, other changes will occur to those skilled in the art. It is therefore intended that the scope of the present invention is to be limited only by the scope of the appended claims.

We claim:
1. Radar altimeter means including:
   A. transmitter means for generating radio frequency pulses;
   B. antenna means for transmitting said radio frequency pulses and for receiving terrain echo signals;
   C. tuned radio frequency receiver means for sensing said received terrain echo signals and for converting said received terrain echo signals to video signals wherein said tuned radio frequency receiver means includes and the received terrain echo signals are sequentially acted upon by;
      1. diode switch means;
      2. bandpass filter means;
      3. radio frequency amplifier means;
      4. detector means;
   D. video processing and timing circuit means for amplifying said video signals and for producing a signal; and
   E. power source means for powering said radar altimeter means.
2. The radar altimeter means of claim 1 further including a release mechanism and wherein said signal produced by said video processing and timing circuit means is a trigger signal for activating said release mechanism when said amplified video signal exceeds a threshold corresponding to a selected altitude.
3. The radar altimeter means of claim 1 wherein said antenna means includes an antenna for both transmitting and receiving.
4. The radar altimeter means of claim 1 further including means for integrating said amplified video signals and for generating a trigger signal when the amplitude of said amplified video signals correspond to a selected altitude.

5. Radar altimeter means for sensing a predetermined altitude range and for causing the release and deployment of a survival kit including:
   A. transmitter means for generating radio frequency pulses;
   B. antenna means including an antenna for both transmitting said radio frequency pulses and for receiving terrain echo signals;
   C. tuned radio frequency receiver means for sensing said terrain echo signals received by said antenna means and for converting said terrain echo signals to video signals wherein said tuned radio frequency receiver means includes and the received terrain echo signals are sequentially acted upon by;
      1. diode switch means;
      2. bandpass filter means;
      3. radio frequency amplifier means;
      4. detector means; and
   D. video processing and timing circuit means for amplifying said video signals and for integrating said video signals and for generating a trigger signal when said amplified video signals correspond to a preselected altitude.

6. Radar altimeter means including:
   A. transmitter means for generating radio frequency pulses;
   B. antenna means for transmitting said radio frequency pulses and for receiving terrain echo signals;
   C. tuned radio frequency receiver means for sensing said received terrain echo signals and for converting said received terrain echo signals to video signals wherein said tuned radio frequency receiver means includes and the received terrain echo signals are sequentially acted upon by;
      1. bandpass filter means;
      2. radio frequency amplifier means;
      3. detector means;
   D. video processing and timing circuit means for amplifying said video signals and for producing a signal; and
   E. power source means for powering said radar altimeter means.

* * * * *